US007222068B2

(12) United States Patent
Leaning et al.

(10) Patent No.: US 7,222,068 B2
(45) Date of Patent: May 22, 2007

(54) AUDIO SIGNAL ENCODING METHOD COMBINING CODES HAVING DIFFERENT FRAME LENGTHS AND DATA RATES

(75) Inventors: Anthony R Leaning, Ipswich (GB); Richard J Whiting, Ipswich (GB)

(73) Assignee: British Telecommunications public limited company, London (GB)

( * ) Notice: Subject to any disclaimer, the term of this patent is extended or adjusted under 35 U.S.C. 154(b) by 892 days.

(21) Appl. No.: 10/433,054

(22) PCT Filed: Nov. 19, 2001

(86) PCT No.: PCT/GB01/05082

§ 371 (c)(1), (2), (4) Date: May 30, 2003

(87) PCT Pub. No.: WO02/49008

PCT Pub. Date: Jun. 20, 2002

(65) Prior Publication Data

US 2004/0030547 A1 Feb. 12, 2004

(30) Foreign Application Priority Data

Dec. 15, 2000 (EP) ................................ 00311275

(51) Int. Cl.
*G10L 19/00* (2006.01)
*G10L 15/04* (2006.01)
*G10L 19/10* (2006.01)
*G10L 21/04* (2006.01)

(52) U.S. Cl. .................. 704/201; 704/200.1; 704/248; 704/501; 704/502; 704/503

(58) Field of Classification Search ............ 704/200.1, 704/201, 248, 501, 502, 503
See application file for complete search history.

(56) References Cited

U.S. PATENT DOCUMENTS 5,835,495 A 11/1998 Ferriere
5,903,872 A * 5/1999 Fielder ...................... 704/500
6,061,655 A * 5/2000 Xue et al. .................. 704/500
6,118,790 A 9/2000 Bolosky et al.
6,124,895 A 9/2000 Fielder

FOREIGN PATENT DOCUMENTS

EP 0669587 A2 8/1995
EP 0926903 A1 6/1999
EP 1049074 A1 11/2000

* cited by examiner

*Primary Examiner*—Tālivaldis Ivars Šmits
*Assistant Examiner*—Abdelali Serrou
(74) *Attorney, Agent, or Firm*—Nixon & Vanderhye P.C.

(57) ABSTRACT

A system for transmitting audio signals over a telecommunications link generates the signals as two or more alternative feeds, for example at different data rates. The two feeds are encoded using coding methods having a frame structure with different frame lengths. To facilitate switching between the two, the input signal is notionally divided into temporal portions and each is coded by taking it, plus enough of the next (or preceding) portion to make up a whole number of frames, and encoding it, whereby the encoded portions overlap—at least for one of the feeds. The overlap is lost upon decoding by discarding duplicate material.

5 Claims, 3 Drawing Sheets

Fig.3.

```
<html>
<head>

<!-- Odbits: Mode = "recorded" -->
<!--   Audio = "mp3-024k_11_s mp3-032k_11_s mp3-018k_11_s mp3-016k_11_m
mp3-008k_11_m" -->
<!-- LFI = "44" -->
<!-- SL = "178" -->
<!-- Title = "Toccata and Fugue in D minor" -->
<!-- Author = "J.S. Bach" -->
<!-- Created = "6 Nov 2000" -->
<!-- Copyright = "© 1999" -->
<!-- Comments = "One of Bach's many organ works." -->
</head>
<body>
An announcement to appear on the display
</body>
</html>
```

AUDIO SIGNAL ENCODING METHOD COMBINING CODES HAVING DIFFERENT FRAME LENGTHS AND DATA RATES

This application is the US national phase of international application PCT/GB01/05082 filed 19 Nov. 2001 which designated the U.S.

The present invention is concerned with the delivery, over a telecommunications link, of digitally coded material for presentation to a user.

According to one aspect of the invention there is provided a method of encoding audio signals comprising notionally dividing an input signal into successive temporal portions;

encoding said input temporal portions using a first encoding algorithm having a first frame length to produce a first encoded sequence of encoded temporal portions;

encoding said input temporal portions using a second frame length to produce a second sequence of encoded temporal portions;

wherein at least one of the encoding steps comprises encoding one input temporal portion along with so much of the end of the preceding temporal portion and/or the beginning of the immediately following temporal portion as to constitute with said one temporal portion an integral number of frames.

In another aspect, the invention provides a method of encoding input audio signals comprising: encoding with a first coding algorithm having a first frame length each of successive first temporal portions of the input signal, which portions correspond to an integral number of said first frame lengths and either are contiguous or overlap, to produce a first encoded sequence; encoding with a second coding algorithm having a second frame length each of successive second temporal portions of the input signal, which portions correspond to an integral number of said second frame lengths and do not correspond to an integral number of said first frame lengths and which overlap, to produce a second encoded sequence such that each overlap region of the second encoded sequence encompasses at least partially a boundary between, or, as the case may be, overlap region portions of, the first encoded sequence which correspond to successive temporal portions of the input signal.

Other, optional, aspects of the invention are set out in the sub-claims.

Note that the following description and drawings is identical to that contained in our co-pending international patent application entitled "Delivery of Audio and or Video Material" (Applicant's ref A26097) filed on the same day as the present application, claiming priority from GB 00 30706.6.

Some embodiments of the present invention will now be described, with reference to the accompanying drawings, in which:

FIG. 3 shows the contents of a typical index file;

Figure 1:
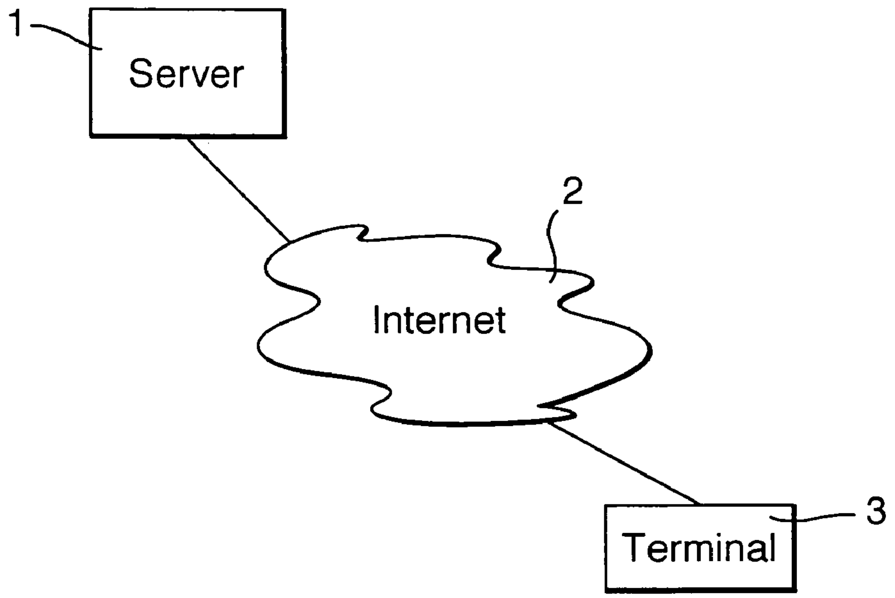
FIG. 1 is a diagram illustrating the overall architecture of the systems to be described.

The system shown in FIG. 1 has as its object, the delivery, to a user, of digitally coded audio signals (for example, of recorded music or speech) via a telecommunications network to a user terminal where the corresponding sounds are to be played to the user. However, as will be discussed in more detail below, the system may be used to convey video signals instead of, or in addition to, audio signals. In this example, the network is the Internet or other packet network operating in accordance with the Hypertext Transfer Protocol (see RFCs 1945/2068 for details), though in principle other digital links or networks can be used. It is also assumed that the audio signals have been recorded in compressed form using the ISO MPEG-1 Layer III standard (the "MP3 standard"); however it is not essential to use this particular format. Nor, indeed, is it necessary that compression be used, though naturally it is highly desirable, especially if the available bit-rate is restricted or storage space is limited. In FIG. 1, a server 1 is connected via the internet 2 to user terminals 3, only one of which is shown. The function of the server 1 is to store data files, to receive from a user terminal a request for delivery of a desired data file and, in response to such a request, to transmit the file to the user terminal via the network. Usually such a request takes the form of first part indicating the network delivery mechanism (e.g. http:// or file:// for the hypertext transfer protocol or file transfer protocol respectively) followed by the network address of the server (e.g. www.server 1.com) suffixed with the name of the file that is being requested. Note that, in the examples given, such names are, for typographical reasons, shown with the "//" replaced by "\\".

In these examples, the use of the hypertext transfer protocol is assumed; this is not essential, but is beneficial in allowing use of the authentication and security features (such as the Secure Sockets Layer) provided by that protocol.

Conventionally, a server for delivery of MP3 files takes the form of a so-called streamer which includes processing arrangements for the dynamic control of the rate at which data are transmitted depending on the replay requirements at the user terminal, for the masking of errors due to packet loss and, if user interaction is allowed, the control of the flow of data between server and client; here however the server 1 contains no such provision. Thus it is merely an ordinary "web server".

The manner in which the data files are stored on the server 1 will now be explained. Suppose that an MP3-format file has been created and is to be stored on the server. Suppose that it is a recording of J. S. Bach's Toccata and Fugue in D minor (BWV565) which typically has a playing time of 9 minutes. Originally this would have been created as a single data file, and on a conventional streamer would be stored as this one single file. Here, however, the file is divided into smaller files before being stored on the server 1. We prefer that each of these smaller files is of a size corresponding to a fixed playing time, perhaps four seconds. With a compressed format such as MP3 this may mean that the files will be of different sizes in terms of the number of bits they actually contain. Thus the Bach file of 9 minutes duration would be divided into 135 smaller files each representing four seconds' playing time. In this example these are given file names which include a serial number indicative of their sequence in the original file, for example:

000000.bin
000001.bin
000002.bin
000003.bin
. . .
000134.bin

The partitioning of the file into these smaller sub-files may typically be performed by the person preparing the file for loading onto the web server 1. (The expression "sub-files" is used here to distinguish them from the original file containing the whole recording: it should however be emphasised that, as far as the server is concerned each "sub-file" is just a file like any other file). The precise manner of their creation will be described more fully below. Once created, these sub-files are uploaded onto the server in a conventional manner just like any other file being loaded onto a web server. Of course the filename could also contain characters identifying the particular recording (the sub-file could also be "tagged" with additional information—when you play an MP3 file you get information on the author, copyright etc), but in this example the sub-files are stored on the server in a directory or folder specific to the particular recording—e.g. mp3_bwv565. Thus a sub-file, when required, may be requested in the form:

http:\\www.server1.com/mp3_bwv565/000003.bin where "www.server1.com" is the URL of the server 1.

It is also convenient for the person preparing the sub-files for loading onto the server to create, for each recording, a link page (typically in html format) which is also stored on the server (perhaps with filename mp3_bwv565/link.htm), the structure and purpose of which will be described later.

It is also convenient that the web server stores one or more (html) menu pages (e.g. menu.htm) containing a list of recordings available, with hyperlinks to the corresponding link pages.

Figure 2:
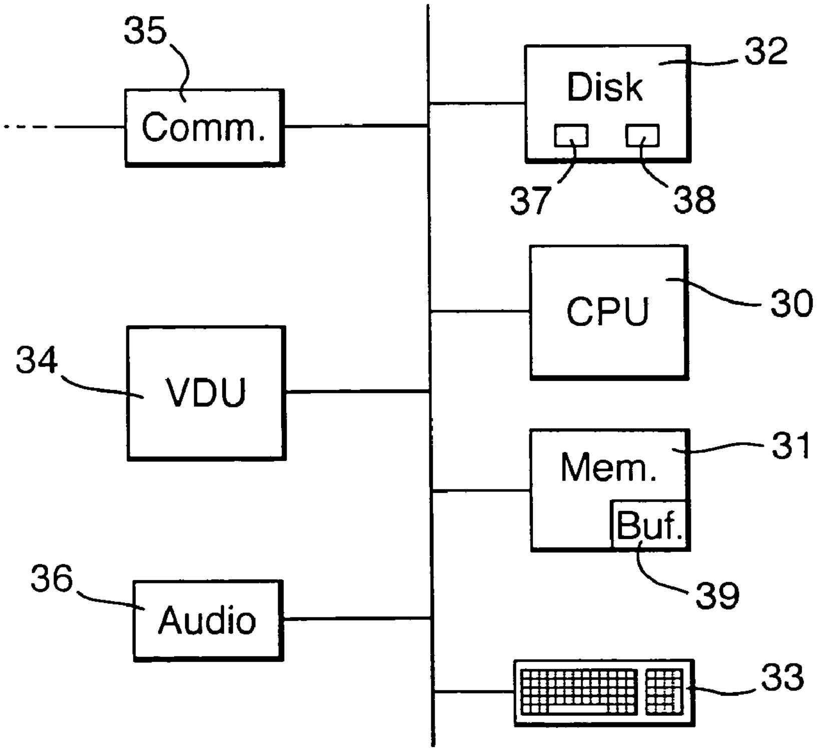
FIG. 2 is a block diagram of a terminal for use in such a system.

Turning now to the terminal, this may typically take the form of a conventional desktop computer, with, however, additional software for handling the reception of the audio files discussed. If desired, the terminal could take the form of a handheld computer, or even be incorporated into a mobile telephone. Thus FIG. 2 shows such a terminal with a central processor 30, memory 31, a disk store 32, a keyboard 33 video display 34, communications interface 35, and audio interface ("sound card") 36. For video delivery, a video card would be fitted in place of, or in addition to, the card 36. In the disk store are programs which may be retrieved into the memory 31 for execution by the processor 30, in the usual manner. These programs include a communications program 37 for call-up and display of html pages—that is, a "web browser" program such as Netscape Navigator or Microsoft Explorer, and a further program 38 which will be referred to here as "the player program" which provides the functionality necessary for the playing of audio files in accordance with this embodiment of the invention. Also shown is a region 39 of the memory 31 which is allocated as a buffer. This is a decoded audio buffer containing data waiting to be played (typically the playout time of the buffer might be 10 seconds). The audio interface or sound card 36 can be a conventional card and simply serves to receive PCM audio and convert it into an analogue audio signal, e.g. for playing through a loudspeaker. Firstly, we will give a brief overview of the operation of the terminal for the retrieval and playing of the desired recording when using the HTTP and an embedded or "plugin" client 1. The user uses the browser to retrieve and display the menu page menu.htm from the server 1.
2. The user selects one of the hyperlinks within the menu page which causes the browser to retrieve from the server, and display, the link page for the desired recording—in this example the file mp3_bwv565_link.htm. The actual display of this page is unimportant (except that it may perhaps contain a message to reassure the user that the system is working correctly). What is important about this page is that it contains a command (or "embed tag") to invoke in the processor 30 a secondary process in which the player program 37 is executed. The invocation of a secondary process in this manner is well-known practice (such a process is known in Netscape systems as a "plug-in" and in Microsoft systems as "ActiveX"). Such commands can also contains parameters to be passed to the secondary process and in the system of FIG. 1 the command contains the server URL of the recording, which, for the Bach piece, would be http:\\www.server1/mp3_bwv565.
3. The player program 37 includes an MP3 decoder, the operation of which is, in itself, conventional. Of more interest in the present context are the control functions of the program which are as follows.
4. The player program, having received the URL, adds to this the filename of the first sub-file, to produce a complete address for the sub-file—i.e. www.server1/mp3_bwv565/000000.bin. It will be observed that this system is organised on the basis that the sub-files are named in the manner indicated above, so that the terminal does not need to be informed of the filenames. The program constructs a request message for the file having this URL and transmits it to the server 1 via the communications interface 35 and the internet 2. (Processes for translating the URL into an IP address and for error reporting of invalid, incomplete or unavailable URLs are conventional and will not therefore be described). We envisage that the player program would send the requests directly to the communications interface, rather than via the browser. The server responds by transmitting the required sub-file.
5. The player program determines from the file the audio decoding used in this sub-file and decodes the file back to raw PCM values in accordance with the relevant standard (MP3 in this example), making a note of the play time of this sub-file. Generally an audio file contains an identifier at the beginning of the file which states the encoding used. The decoded audio data is then stored in the audio buffer 38.
6. The player program has a parameter called the playout time $T_p$. In this example it is set at 10 seconds (it could be made user-selectable, if desired). It determines the degree of buffering that the terminal performs.
7. The player program increments the filename to 000001.bin and requests, receives, decodes and stores this second sub-file as described in (4) and (5) above. It repeats this process until the contents of the buffer reach or exceed the playout time $T_p$. Note that it is not actually essential that the decoding occurs before the buffer but it simplifies matters as since the audio is decoded back to raw PCM then the duration of the buffered material is then explicitly known. It simplifies the control of the audio buffer if each of the sub-files is the same audio playback size.
8. Having reached the playout threshold $T_p$ the decoded data are sent from the buffer to the audio interface 36 which plays the sound through a loudspeaker (not shown).
9. Whilst playing the sounds as in (8) above, the player program continually monitors the state of buffer fullness and whenever this falls below $T_p$ it increments the filename again and obtains a further sub-file from the server. This process is repeated until a "file not found error" is returned.
10. If, during this process, the buffer becomes empty, the player program simply ceases playing until further data arrives.

The sub-file naming convention used here, of a simple fixed length sequence of numbers starting with zero, is preferred as it is simple to implement, but any naming convention can be used provided the player program either contains (or is sent) the name of the first sub-file and an algorithm enabling it to calculate succeeding ones, or alternatively is sent a list of the filenames.

It will have been observed that the system described above offers the user no opportunity to intervene in the replay process. Nor does it offer any remedy for the possibility of buffer underflow (due for example to network congestion). Therefore a second, more sophisticated embodiment of the invention, now to be described, offers the following further features:

a) the server stores two or more versions of the recording, recorded at different compression rates (for example at compressions corresponding to (continuous) data rates of 8, 16, 24 and 32 kbit/s respectively) and the player program is able to switch automatically between them.

b) the player program displays to the user a control panel whereby the user may start the playing, pause it, restart it (from the beginning, or from the point at which it paused), or jump to a different point in the recording (back or forward).

Note that these features are not interdependent, in that user control could be provided without rate-switching, or vice versa.

In order to provide for rate switching, the person preparing the file for loading onto the server prepares several source files—by encoding the same PCM file several times at different rates. He then partitions each source file into sub-files, as before. These can be loaded onto the server in separate directories corresponding to the different rate, as in the following example structure, where "008k", "024k" in the directory name indicates a rate of 8 kbit/s or 24 kbit/s and so on.

He also creates an index file (e.g. index.htm) the primary purpose of which is to provide a list of the data rates that are available.

| Directory | Subdirectory | Filename |
|---|---|---|
| mp3_bwv565 | none | link.htm |
| | | index.htm |
| mp3_bwv565 | 008k_11_m | 000000.bin |
| | | 000001.bin |
| | | 000002.bin |
| | | 000003.bin |
| | | . |
| | | . |
| | | . |
| | | 000134.bin |
| mp3_bwv565 | 016k_11_m | 000000.bin |
| | | 000001.bin |
| | | 000002.bin |
| | | 000003.bin |
| | | . |
| | | . |
| | | . |
| | | 000134.bin |
| mp3_bwv565 | 018k_11_s | 000000.bin |
| | | 000001.bin |
| | | 000002.bin |
| | | 000003.bin |
| | | . |
| | | . |
| | | . |
| | | 000134.bin |
| mp3_bwv565 | 024k_11_s | 000000.bin |
| | | 000001.bin |
| | | 000002.bin |
| | | 000003.bin |
| | | . |
| | | . |
| | | . |
| | | 000134.bin |
| mp3_bwv565 | 032k_11_s | 000000.bin |
| | | 000001.bin |
| | | 000002.bin |
| | | 000003.bin |
| | | . |
| | | . |
| | | . |
| | | 000134.bin |

Note that because the length of a sub-file corresponds, as explained earlier, to a fixed length of time, the number of sub-files is the same for each directory. The subdirectory names comprise the data rate in kbit/s (three digits) plus the letter "k"; in this example indications of the audio sampling rate (11.025 kHz) and a mono-stereo flag are appended, for verification purposes.

The index file would thus contain a statement of the form:

<!Audio="024k_11_s 032k_11_s 018k_11_s 016k_11_m 008_11_m"-->

(The <!--...--> simply indicates that the statement is embedded as a comment in an html file (or a simple text file could be used)). A typical index file is shown in FIG. 3 where other information is included: LFI is the highest sub-file number (i.e. there are 45 sub-files) and SL is the total playing time (178 seconds). "Mode" indicates "recorded" (as here) or "live" (to be discussed below). The other entries are either self-explanatory, or standard html commands.

Initially the player program will begin by requesting, from the directory specified in the link file, the index file, and stores locally a list of available data rates for future reference. (It may explicitly request this file or just specify the directory: most servers default to index.htm if a filename is not specified.) It then begins to request the audio sub-files as described earlier, from the first-mentioned "rate" directory in the index file—viz. 024k_11_s (or the terminal could override this by modifying this to a default rate set locally for that terminal). The process from then on is that the player program measures the actual data rate being received from the server, averaged over a period of time (for example 30 seconds). It does this by timing every URL request; the transfer rate achieved (number of bits per second) between the client and server is determined. The accuracy of this figure improves as the number of requests goes up. The player maintains two stored parameters which indicate, respectively, the current rate, and the measured rate.

The initiation of a rate change is triggered:

a) if the buffer ever empties AND the measured rate is less than the current rate AND the measured Buffer Low Percentage exceeds a Step Down Threshold (as described below), reduce the current rate; (changing at a time when the buffer is already empty is advantageous as the sound card is not playing anything and it may be necessary to reconfigure it if the audio sampling rate, stereo-mono setting or bit width (number of bits per sample) has changed).

b) if the measured rate exceeds not only the current rate but also the next higher rate for a given period of time (e.g. 120 seconds: this could if desired be made adjustable by the user) increase the current rate The Buffer Low Percentage is the percentage of the time that the buffer contents represent less than 25% of the playout time (i.e. the buffer is getting close to being empty).

If the Step Down Threshold is set to 0% then when the buffer empties the system always steps down when the other conditions are satisfied. Setting the Step Down Threshold to 5% (this is our preferred default value) means that if the buffer empties but the measured Buffer Low Percentage is greater than 5% it will not step down. Further buffer empties will obviously cause this measured rate to increase and will eventually empty the buffer again with a Buffer Low Percentage value exceeding 5% if the rate can not be sustained-.Setting the value to 100% means the client will never step down.

The actual rate change is effected simply by the player program changing the relevant part of the sub-file address for example, changing "008k" to "024k" to increase the data rate from 8 to 24 kbit/s, and changing the current rate parameter to match. As a result, the next request to the server becomes a request for the higher (or lower) rate, and the sub-file from the new directory is received, decoded and entered into the buffer. The process just described is summarised in the following flowchart:

| User | Terminal | Server |
|---|---|---|
| Select Menu page | | |
| | Request http:\\server1.com/menu.htm | |
| | | Send http:\\server1.com/menu.htm |
| | Display menu.htm | |
| Select item from Menu (Bach) | | |
| | Extract hyperlink URL from menu.htm (mp3___bwv565/link.htm)<br>Request http:\\server1.com/mp3__bwv565/link.htm | |
| | | Send http:\\server1.com/mp3__bwv565/link.htm |
| | Display link.htm<br>Execute secondary process (player program) specified in link.htm with parameters specified in link.htm (http:\\server1/mp3__bwv565)<br>Set Stem to that specified<br>Set URL = Stem + "index.htm"<br>Request this URL | |
| | | Send requested file |
| | Set Rate List to rates specified in index.htm<br>Set LFI to value specified in index.htm<br>Set StemC = Stem + "/" + RateList(item 1)<br>Set CurrentRate = rate specified in RateList (item 1)<br>Set RateU = next higher rate in list or zero if none<br>Set StemU = Stem + "/" + item in rate list corresponding to this rate;<br>Set RateD = next lower rate in list or zero if none<br>Set StemD = Stem + "/" + item in rate list corresponding to this rate;<br>Set Current Subfile = 000000.bin<br>J1: Set URL = StemC + Current Subfile<br>Request this URL | |
| | | If requested subfile exists, Send requested subfile; otherwise send error message |
| | If error message received, Stop<br>Decode received subfile<br>Write to buffer<br>JIA: If Buffer Fullness > Tp seconds go to Step J3<br>J2: Increment Current Subfile<br>Go to Step J1<br>J3: Begin/continue playing of buffer contents via sound card<br>J4: If Buffer Fullness < Tp seconds go to Step J2<br>If BufferFullness = 0 AND Mrate < CurrentRate AND BufferLow% > Td go to Stepdown<br>If MRate > NextRate AND NextRate <> 0 goto Stepup | |

-continued

| User | Terminal | Server |
|---|---|---|
| Input of user commands | If UserCommand = Pause then:<br>Stop reading from buffer;<br>Loop until Usercommand = Resume;<br>go to J3<br>If UserCommand = Jump(j%)then:<br>Clear buffer;<br>Set CurrentSubfile =<br>Integer[(LFI + 1) * j / 100];<br>go to Step J1<br>Go to Step J1A<br>Stepup:<br>Clear Buffer<br>Set RateD = RateC<br>Set StemD = StemC<br>Set RateC = RateU<br>Set StemC = StemU<br>Set RateU = next higher rate in list or zero if none<br>Set StemU = Stem + “/” + item in rate list corresponding to this rate<br>Go to Step J1A<br>Stepdown:<br>Clear Buffer<br>Set RateU = RateC<br>Set StemU = StemC<br>Set RateC = RateD<br>Set StemC = StemD<br>Set RateD = next lowerr rate in list or zero if none<br>Set StemD = Stem + “/” + item in rate list corresponding to this rate<br>Go to Step J1A | |

The user control is implemented by the user being offered on the screen the following options which he can select using the keyboard or other input device such as a mouse:

a) Start: implement the numbered steps given above, from step 4. Whether, when a recording is first selected, it begins to play automatically, or requires a Start instruction from the user, is optional; indeed, if desired, the choice may be made by means of an additional “autoplay” parameter in the link file.

b) Pause: implemented by an instruction to the MP3 decoder to suspend reading data from the buffer;

c) Resume: implemented by an instruction to the MP3 decoder to resume reading data from the buffer;

d) Jump: implemented by the user indicating which part of the recording he wishes to jump to—for example by moving a cursor to a desired point on a displayed bar representing the total duration of the recording; the player then determines that this point is x % along the bar and calculates the number of the next sub-file needed, which is then used for the next request. In the Bach example with 125 sub-files then a request to play from a point 20% into the recording would result in a request for the 26th sub-file—i.e. 000025.bin. It will be apparent that this calculation is considerably simplified if each sub-file corresponds to the same fixed duration. We prefer, in the case of the jump, to suspend decoding and clear the buffer so that the new request is sent immediately, but this is not actually essential.

It is of interest to discuss further the process of partitioning the original file into sub-files. First, it should be noted that if (as in the first version described above), there is no expectation that a sub-file will be followed by a sub-file other than that which immediately follows it in the original sequence, then it matters little where the boundaries between the sub-files are located. In that case the sub-file size can be a fixed number of bits, or a fixed playing time length (or neither of these)—the only real decision is how big the sub-files should be. Where jumps are envisaged (in time, or between different data rates) there are other considerations. Where, as with many types of speech or audio coding (including MP3), the signal is coded in frames, a sub-file should contain a whole number of frames. In the case of rate switching, it is, if not actually essential, highly desirable that the sub-file boundaries are the same for each rate, so that the first sub-file received for a new rate continues from the same point in the recording that the last sub-file at the old rate ended. To arrange that every sub-file should represent the same fixed time period (e.g. the 4 seconds mentioned above) is not the only way of achieving this, but it is certainly the most convenient. Note however that, depending on the coding system in use, the requirement that a sub-file should contain a whole number of frames may mean that the playing duration of the sub-files does vary slightly. Note that in this embodiment of the invention, the available data rates, though they use different degrees of quantisation, and differ as to whether they encode in mono or stereo, all use the same audio sampling rate and in consequence the same frame size. Issues that need to be addressed when differing frame sizes are used are discussed below.

As for the actual sub-file length, excessively short sub-files should preferably be avoided because (a) they create extra network traffic in the form of more requests, and (b) on certain types of packet networks—including IP networks—they are wasteful in that they have to be conveyed by smaller packets so that overhead represented by the requesting process and the packet header is proportionately greater. On the other hand, excessively large sub-files are disadvantageous in requiring a larger buffer and in causing extra delay a when starting play and/or when jumps or rate changes are invoked. A sub-file size of between 30% and 130% of the playout time, or preferably around half the playout time (as in the examples given above), is found to be satisfactory.

The actual process of converting the sub-files can be implemented by means of a computer programmed in accordance with the criteria discussed. Probably it will be convenient to do this on a separate computer, from which the sub-files can be uploaded to the server.

Another refinement that can be added is to substitute a more complex sub-file naming convention so as to increase security by making it more difficult for an unauthorised person to copy the sub-files and offer them on another server. One example is to generate the filenames using a pseudo-random sequence generator, e.g. producing filenames of the form:

01302546134643677534543134.bin 94543452345434533452134565.bin

. . .

In this case the player program would include an identical pseudo-random sequence generator. The server sends the first filename, or a "seed" of perhaps four digits, and the generator in the player can then synchronise its generator and generate the required sub-file names in the correct sequence.

In the above example of rate-switching, all the data rates used had the same frame size, specifically they used MP3 coding of PCM audio sampled at 11.025 KHz and a (PCM) frame size of 1152 samples. If it is desired to accomplish rate switching between MP3 (or other) recordings having different frame sizes, problems arise due to the requirement that a sub-file should contain a whole number of frames, because the frame boundaries do not then coincide. This problem can be solved by the following modified procedure for creating the sub-files. It should be noted particularly that this procedure can be used in any situation where rate switching is required and is not limited to the particular method of delivery discussed above.

Figure 4:
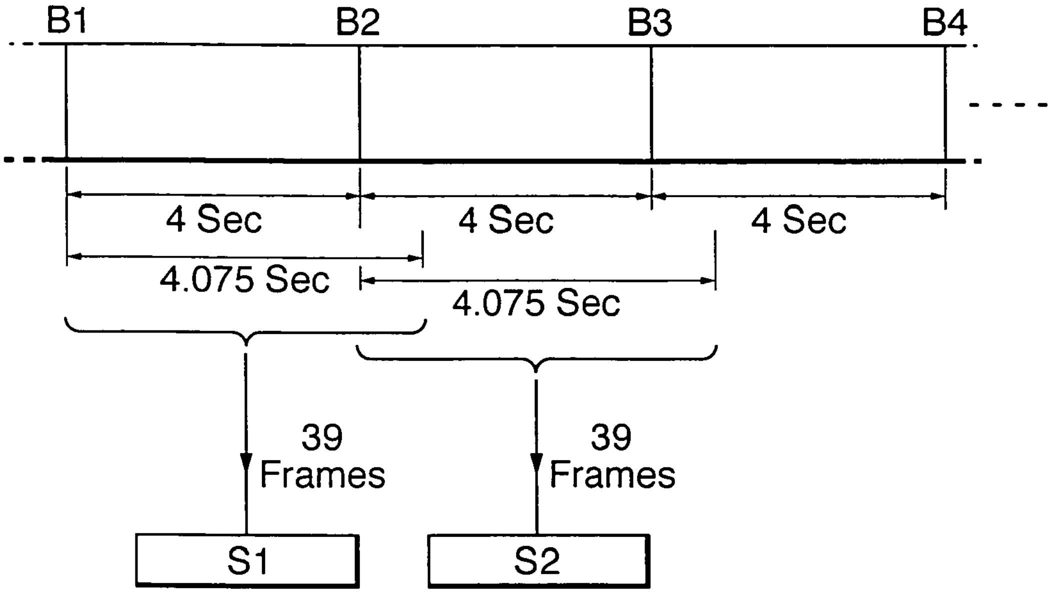
FIG. 4 is a timing diagram illustrating a modified method of sub-file generation.

FIG. 4 shows diagrammatically a sequence of audio samples, upon which successive four-second segments are delineated by boundary marks (in the figure) B1, B2 etc. At 11.025 KHz, there are 44,100 samples in each segment.

1. Encode the audio, starting at boundary B1, frame by frame, to create an MP3 sub-file, continuing until a whole number of frames having a total duration of at least four seconds has been encoded. With a frame size of 1152 samples, four seconds corresponds to 38.3 frames, so a sub-file S1 representing 39 frames will actually be encoded, representing a total duration of 4.075 seconds.
2. Encode the audio, in the same manner, starting at boundary B2.
3. Repeat, starting each time at a 4-second boundary, so that in this way a set of overlapping sub-files is generated for the whole audio sequence to be coded. The last segment (which may well be shorter than four seconds) has of course nothing following it, and is padded with zeroes (i.e. silence).

Coding of the other data rates using different frame sizes proceeds in the same manner.

At the terminal, the control mechanisms are unchanged, but the decoding and buffering process is modified:

1. Receive sub-file S1;
2. Decode sub-file S1;
3. Write into the buffer only the first four seconds of the decoded audio samples (discard the remainder);
4. Receive sub-file S2;
5. Decode sub-file S2;
6. Write into the buffer only the first four seconds of the decoded audio samples;
7. Continue with sub-file S3 etc.

In this way, it is ensured that the sub-file sets for all rates have sub-file boundaries which correspond at the same points in the original PCM sample sequence.

Thus, each four-second period except the last is, prior to encoding, "padded" with audio samples from the next four-second period so as to bring the sub-file size up to a whole number of MP3 frames. If desired, the padding samples could be taken from the end of the preceding four-second period instead of (or as well as) the beginning of the following one.

Note that the MP3 standard allows (by a scheme known as "bit reservoir") certain information to be carried over from one audio frame to another. In the present context, while this is acceptable within a sub-file, it is not acceptable between sub-files. However, since naturally the standard does not allow such carry-over at the end or beginning of a recording, this problem is easily solved by encoding each sub-file separately, as if it were a single recording.

Changes of sampling rate (and indeed switching between mono and stereo operation) have some practical implications for operation of the audio interface 36. Many conventional sound cards, although capable of operation at a range of different settings, require re-setting in order to change sampling rate, and necessarily this causes an interruption in its audio output. Thus in a further modification, we propose that the sound card could be run continuously at the highest sampling rate envisaged. When the player program is supplying, to the buffer, data at a lower sampling rate, this data is then up-sampled to this highest rate before or after the buffer. Similarly, if the card is always operated in stereo mode, decoded mono signals can be fed in parallel so feed both the left and right channels of the sound card input. Again, if the number of bits per sample of the decoded signal is lower than expected by the card, the number of bits can be increased by padding with zeros.

Recollecting that the criteria discussed earlier for automatic data rate switching downwards envisaged a rate reduction only in cases of buffer underflow (involving therefore interruptions in the output), we note that with this modification such interruption can be avoided and therefore a criterion which anticipates underflow and avoids it in the majority of cases. In this case the first of the three AND conditions mentioned above (namely, that the buffer is empty) would be omitted.

The same principle may be applied to the delivery of video recordings, or of course, video recordings with an accompanying sound track. In the simpler version, where there is only one recording, the system differs from the audio version only in that the file is a video file (e.g. in H.261 or MPEG format) and the player program incorporates a video decoder. The manner of partitioning the file into sub-files is unchanged.

As in the audio case, there may be two or more recordings corresponding to different data rates, selected by the control mechanism already described. Also one can provide additional recordings corresponding to different replay modes such as fast forward or fast reverse which can be selected by an extension of the user control facilities already described. Again, a systematic convention for file and directory naming can be followed so that the player program can respond to—for example—a fast forward command by amending the sub-file address.

The delivery of video recordings does however have further implications for file partitioning if switching or jumps are to be permitted. In the case of recordings where each frame of a picture is coded independently, it is sufficient that a sub-file contains a whole number of frames of a picture. If compression involving inter-frame techniques is in use, however, the situation is more complex. Some such systems (for example the MPEG standards) generate a mixture of independently coded frames ("intra-frames") and predictively coded frames; in this case each sub-file should preferably begin with an intra-frame.

In the case of inter-frame coding systems such as the ITU H.261 standard, which do not provide for the frequent, regular inclusion of intra-frames, this is not possible. This is because—taking rate-switching as an example, if one were to request sub-file n of a higher bit rate recording followed by sub-file n+1 of a lower bit-rate recording, the first frame of the lower bit-rate sub-file would have been coded on an inter-frame basis using the last decoded frame of sub-file n of the lower rate recording, which of course the terminal does not have at its disposal—it has the last decoded frame of sub-file n of the higher rate recording. Thus serious mistracking of the decoder would occur.

In the case of switching between normal play and a fast play mode, the situation is in practice slightly different. On fast forward play at, for example, 5 times normal speed, one encodes only every 5th frame. In consequence the inter-frame correlation is much reduced and inter-frame coding becomes unattractive, so one would generally prefer to encode a fast play sequence as intra-frames. Switching from normal to fast then presents no problem, as the intra-frames can be decoded without difficulty. However, when reverting to normal play, the mistracking problem again occurs because the terminal is then presented with a predictively coded frame for which it does not have the preceding frame.

In either case the problem can be solved by using the principle described in our international patent application No. WO98/26604 (issued in USA as U.S. Pat. No. 6,002, 440). This involves the encoding of an intermediate sequence of frames which bridges the gap between the last frame of the preceding sequence and the first frame of the new sequence.

The operation of this will now be described in the context of fast forward operation (fast rewind being similar but in reverse). In this example we assume that a 9 minute video sequence has been encoded at 96 kbit/s according to the H.261 standard, and again at 5 times normal rate entirely at H.261 infra-frames, and that the resulting files have each been partitioned into four-second sub-files. Here, four seconds refers to the duration of the original video signal, not to the fast forward playing time. Following a naming convention similar to that employed above, the sub-files might be:

| Directory | Subdirectory | Filename |
|---|---|---|
| mpg_name | 096k_x1 | 000000.bin<br>000001.bin<br>. . .<br>000134.bin |
| | 096k_x5 | 000000.bin<br>. . .<br>000134.bin |

where "name" is a name to identify the particular recording, "x1" indicates normal rate and "x5" indicates five times normal rate - i.e. fast forward.

To switch from normal play to fast forward is only necessary for the player program to modify the sub-file address to point to the fast forward sequence—e.g.

Request mpg_name/096k_x1/000055.bin is followed by

Request mpg_name/096K_x5/000056.bin

In order to construct the bridging sequences for switching back to normal play it is necessary to construct a bridging sub-file for each possible transition. As described in our international patent application mentioned above, a sequence of three or four frames is generally sufficient for bridging, so a simple method of implementation is to construct bridging sub-files of only 4 frames duration—e.g.

| Directory | Subdirectory | Filename |
|---|---|---|
| mpg_name | 096K_5 > 1 | 0000001.bin<br>. . .<br>000133.bin |

So that the switching is accomplished by a series of requests such as:

Request mpg_name/096k_x5/000099.bin

Request mpg_name/096k_>1/000099.bin

Request mpg_name/096k_x1/000100.bin

The bridging sub-file is generated as follows:

Decode the fast forward sequence to obtain a decoded version of the last frame of sub-file 99, (at 25 frames per second this will be frame 100,000 of the original video signal).

Decode the normal sequence to obtain a decoded version of the first frame of sub-file 100 (i.e. frame 100,001). Re-encode this one frame four times using H.261 inter-frame coding based on the decoded frame 100,000 as the initial reference frame.

Thus, when the decoder has decoded the fast forward sub-file, followed by the bridging sub-file it will have reconstructed frame 100,000 correctly and will be ready to decode the normal (x1) frames. Incidentally, the reason that one encodes the same frame several times in this procedure is that doing so merely once, would produce poor picture quality due to the quantisation characteristics of H.261.

Exactly the same process could be used for rate-switching (albeit that now bridging sub-files are required in both directions). However, it will be observed that, as described, the bridging sub-file results in a freezing of the picture for a period of four frames—i.e. (at 25 frames per second) 160 ms. In switching from fast to normal play this is acceptable—indeed one would probably choose to clear the buffer at this point. It may or may not be subjectively acceptable on rate-switching. An alternative therefore would be to construct a four-second bridging sequence. The request series would then look like:

mpg_name/096k_x1/000099.bin mpg_name/096/128_x1/000100.bin mpg_name/128k_x1/000101.bin The bridging sub-file would in that case be constructed either by recoding the fifth decoded frame of the decoded 128 kbit/s sequence four times starting with decoded 96 kbit/sframe 100,000 as the reference frame, or coding the first four frames of the decoded 128 kbit/s sequence starting with decoded 96 kbit/s frame 100,000 as the reference frame. In both cases the remaining 96 frames of the bridging sub-file would be a copy of the 128 kbit/s sub-file.

The files to be delivered have been referred to as "recordings". However, it is not necessary that the entire audio or video sequence should have been encoded—or even exist—before delivery is commenced. Thus a computer could be provided to receive a live feed, to code it using the chosen coding scheme, and generate the sub-files "on the fly" and upload them to the server, so that, once a few sub-files are present on the server, delivery may commence.

Figure 5:
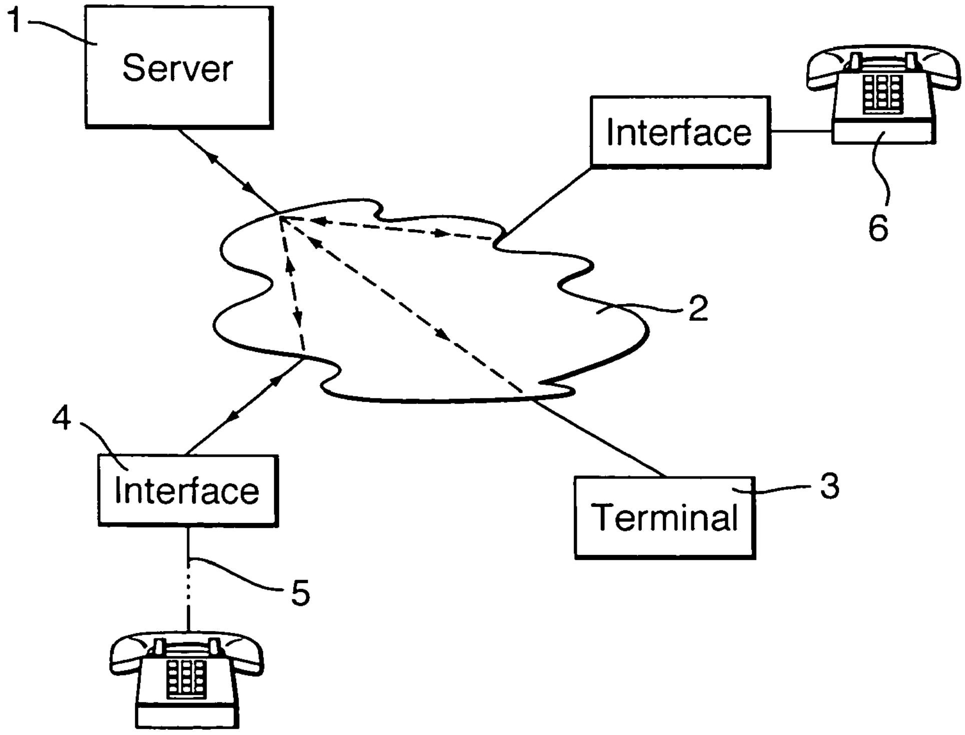
FIG. 5 is a diagram illustrating a modified architecture.

One application of this delivery system would be for a voice-messaging system, as illustrated in FIG. 5 where the server 1, network 2 and terminal 3 are again shown. A voice-messaging interface 4 serves to receive telephone calls, for example via the public switched telephone network (PSTN) 5, to record a message, encode it, partition it into sub-files, and upload them to the server 1, where they can be accessed in the manner described earlier. Alternatively a second interface 6 could be provided, operating in a similar manner to the terminal 3 but controlled remotely via the PSTN by a remote telephone 5, to which the replayed audio signals are then sent.

The same system can be used for a live audio (or video) feed. It is in a sense still "recorded"—the difference being primarily that delivery and replay commence before recording has finished, although naturally there is an inherent delay in that one must wait until at least one sub-file has been recorded and loaded onto the server 1.

The system can proceed as described above, and would be quite satisfactory except for the fact that replay would start at the beginning whereas what the user will most probably want is for it to start now—i.e. with the most recently created sub-file.

With a lengthy audio sequence one may choose to delete the older sub-files to save on storage: with a continuous feed (i.e. 24 hours a day) this will be inevitable and moreover one would need to reuse the sub-file names (in our prototype system we use 000000.bin to 009768.bin and then start again at 000000.bin), so that the older sub-files are constantly overwritten with the new ones. A simple method of ensuring delivery starting with the most recent sub-file would be to include in the index file an extra command instructing the player program to start by requesting the appropriate sub-file. This however has the disadvantage that the index file has to be modified very frequently—ideally every time a new sub-file is created. Therefore we propose a method whereby the player program scans the server to find the starting sub-file, as follows. In the index file, the Mode parameter is set to "live" to trigger the player program to invoke this method. LFI is set to indicate the maximum number of sub-files that may be stored—say 9768. The method involves the following steps and presupposes that (as is conventional) each sub-file's "last modified" time and date has been determined. When using the HTTP protocol this can be achieved using a HEAD request which results not in delivery of the requested sub-file but only of header information indicating the time that the sub-file was written to the server, or zero if the sub-file does not exist. This time is represented below as GetURL(LiveIndex) where LiveIndex is the sequence number of the sub-file in question. Comments are preceded by "//".

```
1   LFI = 9768 // read from the index.htm file
    LiveIndex = LFI / 2
    StepSize = LFI / 2
    LiveIndexModifiedAt = 0; // the beginning of time.
10  ThisIndexWasModifiedAt = GetURL(LiveIndex);
20  If (StepSize = 1) [was If (StepSize == 1)]
    {
    // LiveIndexModifiedAt contains the time the file was written or 0 if no file
    // has been found. LiveIndex contains the index.
    goto 30 [was FINISH]
    }
    StepSize = StepSize / 2
    if (ThisIndexWasModifiedAt > LiveIndexModifiedAt)
    {
    LiveIndexModifiedAt = ThisIndexesModifiedAt;
    LiveIndex = LiveIndex + StepSize
    }
    else
    {
    LiveIndex = LiveIndex - StepSize
    }
    Goto 10
30  FINISH
```

Having found the LiveIndex it is prudent to step back the Tp (playout time) and start to make the requests to fill the audio buffer from there. Playing may commence in the normal way.

Once the recording has actually finished, the index file can if desired be modified to set Mode to "recorded", and any length parameters.

If desired the player program could check periodically to see whether the index file has changed from "live" to "recorded" mode and if so to switch to "recorded" mode playing.

A simpler and much faster method of the identification of the "latest" sub-file will now be described, assuming, first of all, a single continuous sub-file numbering sequence.

1. Terminal issues a HEAD request for the first sub-file (e.g. 000000.bin).

2. The server replies by sending the header of this file and includes the date and time the file was last modified (MODTIME) and the date and time at which this reply was sent (REPLYTIME) (both of these are standard http. fields).

3. The terminal calculates the elapsed time (ELTIME) by subtracting the two (ELTIME=REPLYTIME−MODTIME), and divides this by the playing duration of a sub-file (4 seconds, in these examples) to obtain LIVEINDEX=ELTIME/4.

4. The terminal calculates the filename of the sub-file having this index.

5. The terminal issues a HEAD request with this filename and if necessary each subsequent filename until it receives zero (file not found) whereupon it regards the latest sub-file which is found as the "Current sub-file".

6. The terminal begins requesting files, starting at point J1: of the flowchart given earlier.

This method is considerably faster than that described above for the cyclically numbered sub-files. Note that older sub-files may still be deleted, to reduce storage requirement, as long as the starting sub-file is kept. The method can however be modified to accommodate filename re-use (cyclic addresses), but would require:

(i) That the starting sub-file name (e.g. 000000.bin) is not re-used so that it is always available to supply the header information at Step 2. Thus, with wrapping at 009768.bin, sub-file 009768.bin would be followed by sub-file 000001.bin.

(ii) The calculated LIVEINDEX at Step 3 is taken Modulo 9768 (i.e. the remainder when ELTIME/4 is divided by 9768).

(iii) Sub-file deletion always leads the creation of new sub-files so that a few file-names between the newest sub-file and the oldest undeleted sub-file do not exist, in order that the expected "file not found" response occurs at Step 5.

There may be a danger of the playing operation running slightly faster or slower than the recording operation. To guard against the former it may be arranged that the player program checks each sub-file it receives to ascertain whether it is marked with a later time than the previous one: if not the sub-file is discarded and repeated requests made perhaps three times) followed by a check of the index file if these requests are unsuccessful.

If the playing lags behind the recording process this can be identified by the player program occasionally checking the server for the existence of a significant number of sub-files more recent than those currently being requested, and if such sub-file do exist, initiating a "catching up" process—e.g. by regularly discarding a small amount of data.

The invention claimed is:

1. A method of encoding audio signals comprising notionally dividing an input signal into successive temporal portions;

encoding said input temporal portions using a first encoding algorithm having a first frame length to produce a first encoded sequence of encoded temporal portions;

encoding said input temporal portions using a second frame length to produce a second sequence of encoded temporal portions;

wherein at feast one of the encoding steps comprises encoding one input temporal portion along with so much of the end of the preceding temporal portion and/or the beginning of the immediately following temporal portion as to constitute with said one temporal portion an integral number of frames.

2. A method according to claim 1 in which the first and second encoding algorithms correspond to respective different output data rates.

3. A method according to claim 1 including feeding one sequence of encoded temporal portions to an input and, in response to a switching command, switching the output to be supplied with the other sequence of encoded temporal portions, the switching occurring at the boundary between one encoded temporat portion and the next.

4. A method of transmitting audio signals comprising:

encoding the signals using the method of claim 1;

decoding the discrete portions; and discarding that part of the decoded signal which corresponds to said end and/or beginning.

5. A method of encoding input audio signals comprising: encoding with a first coding algorithm having a first frame length each of successive first temporal portions of the input signal, which portions correspond to an integral number of said first frame lengths and either are contiguous or overlap, to produce a first encoded sequence; encoding with a second coding algorithm having a second frame length each of successive second temporal portions of the input signal, which portions correspond to an integral number of said second frame lengths and do not correspond to an integral number of said first frame lengths and which overlap, to produce a second encoded sequence such that each overlap region of the second encoded sequence encompasses at least partially a boundary between, or, as the case may be, overlap region portions of the first encoded sequence which correspond to successive temporal portions of the input signal.

* * * * *